United States Patent
McMillan et al.

(10) Patent No.: US 7,198,472 B2
(45) Date of Patent: Apr. 3, 2007

(54) PLATFORM MOUNTED COMPONENTS

(75) Inventors: Alison J McMillan, Uttoxeter (GB); Stephen J Booth, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 11/282,602

(22) Filed: Nov. 21, 2005

(65) Prior Publication Data

US 2006/0127217 A1 Jun. 15, 2006

(30) Foreign Application Priority Data

Dec. 10, 2004 (GB) .................... 0427083.1

(51) Int. Cl.
*F04D 29/38* (2006.01)
*F03B 3/12* (2006.01)

(52) U.S. Cl. .................. 416/234; 415/200; 29/889.23; 29/889.71

(58) Field of Classification Search ............... 415/200; 416/234, 241 R, DIG. 5; 29/889.22, 889.21, 29/889.23, 889.71

See application file for complete search history.

(56) References Cited

U.S. PATENT DOCUMENTS

| | | | |
|---|---|---|---|
| 3,266,771 A | 8/1966 | Morley | |
| 3,731,360 A * | 5/1973 | Stone, Jr. | .................. 29/889.71 |
| 4,850,090 A | 7/1989 | Catlow | |
| 6,419,447 B1 | 7/2002 | Watanabe | |
| 6,431,835 B1 | 8/2002 | Kolodziej | |
| 6,805,534 B1 | 10/2004 | Brittingham | |
| 2004/0126239 A1 | 7/2004 | Gautreau | |

FOREIGN PATENT DOCUMENTS

| | | |
|---|---|---|
| EP | 1 426 553 A | 6/2004 |
| GB | 1 141 270 SP | 1/1969 |
| GB | 2 401 657 A | 11/2004 |

* cited by examiner

*Primary Examiner*—Edward K. Look
*Assistant Examiner*—Dwayne J White
(74) *Attorney, Agent, or Firm*—W. Warren Taltavull; Manelli Denison & Selter PLLC

(57) ABSTRACT

A platform arrangement for components such as aerofoil vanes 1, 21 is provided whereby the necessary rigidity provided by the platform does not create excess problems with respect to stress and strain fatigue failure at thinner sections of the component. The leading edge 6, 26 and trailing edge 7, 27 of a vane generally have a thinner section and so when subject to greater flex deformation such flex deformation may lead to premature failure through stress and strain. Structural configurations are now provided which comprise cut out windows 24 in the platform 22 beneath the edges 26, 27 or alternatively differential material types at these locations with a less stiff nature. Generally, a backing member 25 is provided below an integral platform layer 22 to create generally greater stiffness in the platform unit formed by the combination but in accordance with the present invention this backing member 25 may include the cut out windows 24 or have the necessary differential material types for variable flexibility compliance at portions of reduced component cross-section.

13 Claims, 3 Drawing Sheets

PLATFORM MOUNTED COMPONENTS

The present invention relates to platform mounted components and more particularly to aerofoil vane components secured upon platforms in a gas turbine engine.

A large number of components are formed integrally upon platforms whereby those platforms facilitate mounting of the component. For example, with respect to aerofoil vanes used in an aircraft it will be understood that those aerofoil vanes are generally formed with platforms at either end to allow mounting of the aerofoil within a compressor or other stage of the gas turbine engine. Unfortunately, these aerofoil vanes are subject to a number of loads including those as a result of flight operation, thermal cycling and turbulent airflows.

An aerofoil vane typically has two curved surfaces, one concave and one convex. The vane cross-section from leading edge to trailing edge is wider in the middle than at the ends and where the two surfaces meet at the leading and trailing edges of the aerofoil there is a small radius of curvature and it will be understood that the material section of the aerofoil vane is very thin. However, from top to bottom the aerofoil vane may be narrower in the middle. If the aerofoil vane is mounted upon a very stiff platform then when the aerofoil vane flexes there is different distribution of stress and strain on the aerofoil vane. As a result of the curvature of the aerofoil vane, both front to back and as a result of flex motions, it will be understood that there are relatively high deflections of the aerofoil vane leading edge and trailing edges of the vane near the ends of the vane where it meets the platform. As the leading and trailing edges of the aerofoil vane are relatively thin, these regions are less stiff than the mid-chord regions. The high deflections give rise to stress concentrations at the edges of the aerofoil, which may result in fatigue failure at these sites. These problems are prevalent both in aerofoils made from metallic materials and in those made from composite materials, and may lead to buckling of the edges. In composite vanes, delamination of the composite ply materials may also occur.

One approach to alleviating these fatigue problems at the leading and trailing edge of an aerofoil vane is to increase the material thickness in these regions, but this has the detrimental effect of reducing the aerodynamic efficiency of the vane. If this were done, the mid-chord section of the aerofoil would also have to be thickened to maintain the aerodynamic profile of the vane, and this would be counter-productive.

In accordance with the present invention there is provided a platform arrangement for a component comprising a platform for substantially rigidly presenting a component of variable cross-sectional thickness and subject in use to vibration load flexing, the arrangement characterized in that the platform is structurally configured to provide more flexible compliance adjacent to portions of the component having a relatively thin cross-section compared to the remainder of the component.

Typically, the structural configuration is provided by cut out sections in the platform. Alternatively, the structural configuration is provided by choice of material from which the platform is formed adjacent to the component. Typically the material adjacent to the portions of the component having a relatively thin cross-section is appreciably less stiff than the material from which the remainder of the platform is formed. Possibly, the structural configuration is provided by provision of a thinner material cross-section in the platform adjacent to the portion of the component having a relatively thin cross-section compared to the remainder of the component.

Normally, the platform is formed from a composite material. Typically the component is integral with the platform.

Generally, the platform has a backing member to provide the structural configuration for more compliance adjacent to the portions of the component having a relatively thin cross-section compared to the remainder of the component.

Generally the component is an aerofoil vane with a leading edge and a trailing edge. Typically, the platform is structurally configured for more compliance adjacent to the leading and trailing edge of the aerofoil.

Also in accordance with the present invention there is provided a gas turbine engine.

Embodiments of the present invention will now be described by way of example only and with reference to the accompanying drawings in which.

Figure 1:
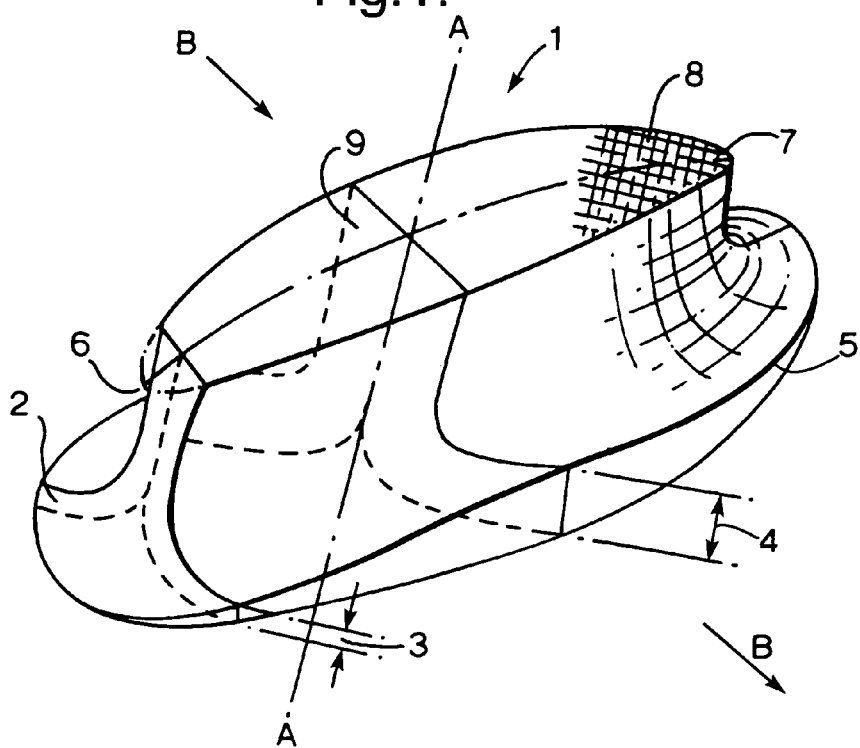
FIG. 1 is a schematic perspective view of an aerofoil vane typical of a component mounted upon a platform in accordance with the present invention.

Essentially the problem relates to the variation in the relative thickness of components when secured upon a stiff platform. The narrow cross-section of portions typical at the leading or trailing edges of an aerofoil vane are therefore susceptible to failure through fatigue in comparison with the generally much thicker middle portions of those vanes. Ideally, transfer of stress and strain in regions of the component where there are high stress/strain factors to areas of comparatively low stress/strain would be advantageous particularly if there is only a marginal effect on the load carrying capacity, stiffness and natural frequencies of the component. Clearly the stiffness and load carrying capacity are affected by the material as well as the form of platform whilst the natural frequencies of the material depend upon design shaping etc.

In accordance with the present invention a platform to which a component is secured is rendered more compliant in the regions of the component where there is a narrower cross-section. As indicated previously these narrower cross-sections, for example in an aerofoil vane, would be at the leading and trailing edges, and would be subject to relatively high deflections leading to concentration of stress and/or strain. Generally, a platform will be molded or cast integrally or forged with the component. In such circumstances it is typical to add a backing member to further stiffen the platform to achieve the desired stiffness and load carrying capacity for the component. In accordance with the present invention this integrally formed platform as well as the backing member can be considered as a platform unit which through its structural configuration provides more flexible compliance in the regions of the platform adjacent to portions of the component having a thinner cross section compared to other parts.

This structural configuration may be achieved by providing cut out pockets in the underside of the platform unit and typically through cut out sections from the backing member at positions below the portions of the components having a narrow cross section, that is to say in an aerofoil vane below the leading and trailing edges of that vane. Alternatively, the platform unit may have material below the portions of the component having a thinner cross-section, that is to say the leading and trailing edges of the vane, which is less stiff than the other parts of the platform unit and therefore provides more compliance in terms of ease of deflection to accommodate flexing in the component in comparison with the remainder of the platform unit.

The platform used in accordance with the present invention can be more readily achieved in the composite material manufacturing process. However, it will be understood that this composite may be an organic composite or a composite of metallic ply materials. In any event, as indicated above, components such as an aerofoil vane are manufactured with a thin integral platform as part of the manufacturing process. The composite material is folded in an appropriate way to create the component.

FIG. 1 illustrates such an aerofoil vane 1, a part of a gas turbine engine. A plurality of such vanes are arranged in a circumferential direction (shown by the arrow B) to form an annular array of vanes which, in use, rotates in the direction of the arrow B about an axis of rotation (not shown). The aerofoil portion of each vane extends further than shown, in a radially outward direction (towards the top of the page, in FIG. 1) along a radial axis A. FIG. 1 shows how the end of the vane is joined into the platform—giving the relative proportion of material carried around the fillet. Thus, folded composite material 2 extends out into a platform about the periphery 3 of the component vane 1. In such circumstances the integral platform is normally reinforced as indicated above with a backing member which is independently formed and therefore can incorporate structural configuration as required and so provides varying compliance in the platform unit comprising the thin platform formed integrally with the component and the backing member.

In FIG. 1 the folding of the material 2 in order to form the component vane leads to a basic platform of uneven thickness. As can be seen the thickness 3 at the leading and trailing edges has a thinner cross-section and more central folded out cross-section 4. It will be appreciated that FIG. 1 depicts a component vane 1 with an edge or "footprint" defined by the line 5 but that this edge will extend outwards in order to form this integral platform. The footprint is the limit of the fillet radius on the join of vane to platform. The platform outside the "footprint" is flat—inside the "footprint" it curves up gradually to meet the vane. This variation in thickness can in itself be a convenient means for ensuring local compliance of the platform at the leading and trailing edges 6, 7. However, this leads to an uneven surface on which to attach a backing member. In order to make the surface more even it is necessary to build up the underside of the vane (or, alternatively, the backing member) with additional material. (This building-up may be seen, for example, in the plies 59 in FIG. 6.) As an alternative to providing cut out windows or apertures in the backing member, the backing member may be structurally configured such that material with a lower stiffness is located below the narrower cross-section portions of the component.

As can be seen the component vane cross-section 8 is formed from the folded material 2 and generally in order to create the curvature either side of the cross-section 8 that folded material 2 is thinner towards the leading and trailing edges 6, 7 in comparison with central waist portions 9 of the component vane 1. As indicated previously it is the thinning cross-section towards the leading and trailing edges 6, 7 which results in greater flexing and therefore fatigue ageing of these edges 6, 7 with resultant premature failure. By providing greater flexibility through compliance in the platform adjacent to the leading and trailing edges 6, 7 the component vane in these portions are able to accommodate greater flex deformation.

Figure 2:
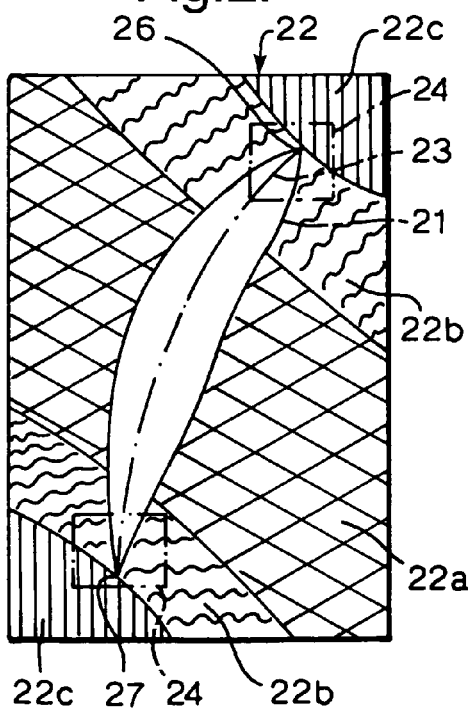
FIG. 2 is a schematic plan view of a bottom end of an aerofoil vane component secured upon a platform in accordance with the present invention.
Figure 3:
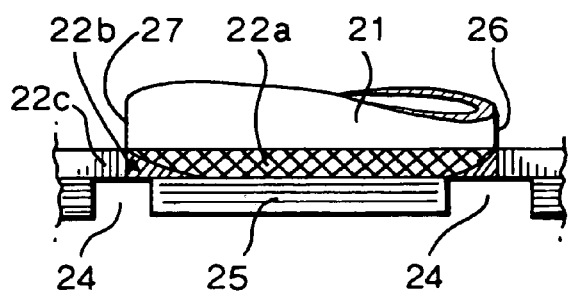
FIG. 3 is a schematic section view illustrating the structural configuration of pockets in a backing member part of a platform in accordance with the present invention.

FIGS. 2 and 3 respectively depict a plan view and side cross-section of a component vane 21 formed and presented upon a platform 22. This platform 22 is schematically sectioned such that a central waist portion 22a has a full thickness whilst leading and trailing edge portions 22b have a partial thickness of material from which the vane 21 is formed. Further portions 22c do not include any part of the vane material. Thus, as indicated previously, in order to provide a more even surface the portions 22b, 22c may be built up with material, which increases the compliance of the platform 22 unit as a whole. An example of such building-up may be seen in the material 61 in FIG. 7. However, as depicted in FIG. 3, illustrating a cross-section along the center line 23 depicted in FIG. 2 it will be noted that cut out windows 24 are provided beneath the leading edge 26 and trailing edge 27. As indicated previously these cut out windows 24 are formed in a backing member 25 secured to the bottom of the platform formed with the component vane 21. In such circumstances the relative rigidity of the platform unit comprising the platform 22 integrally formed with the vane 21 and the backing member 25 is retained for operational performance whilst enhanced compliant flexibility is achieved adjacent to the leading and trailing edges 26, 27. Such enhanced compliant flexibility accommodates the greater deflections expected in the relatively thin wall section leading and trailing edges 26, 27. This greater flexibility will reduce the stress/strain applied to the leading and trailing edges 26, 27.

In some circumstances open cut out windows 24 may be unacceptable in the operational environment of the platform. Thus, these windows 24 may be filled with a highly flexible and compliant foam or other material which essentially provides surface continuity for the backing member 25 of the platform unit comprising that backing member 25 and integral platform layer 22. The cut off windows 24 are shown as rectangular sections, but may be round, oval or other shapes without corners.

Figure 4:
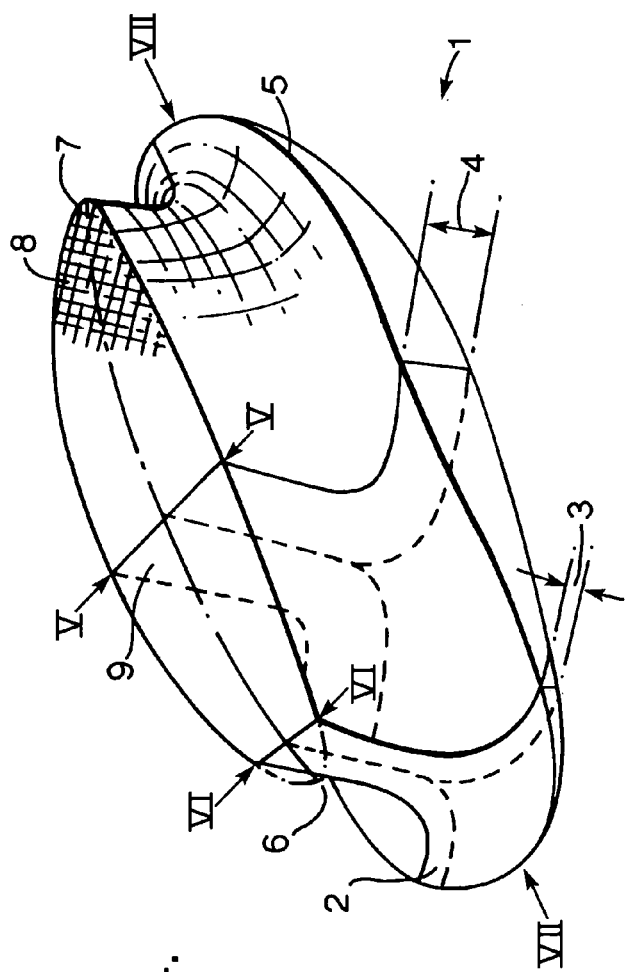
FIG. 4 is a further schematic perspective view of an aerofoil vane typical of a component mounted upon a platform in accordance with the present invention.
Figure 5:
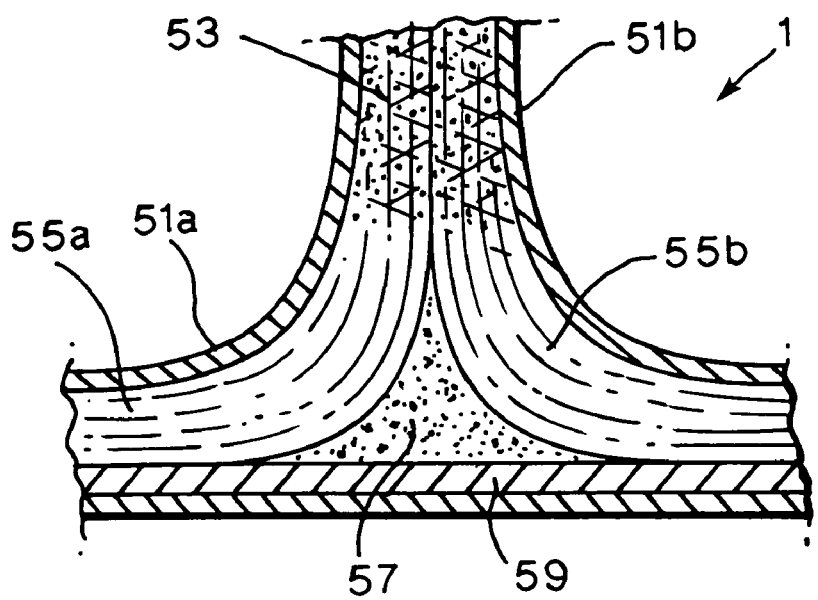
FIG. 5 is a cross-section on the line V—V of FIG. 4.
Figure 6:
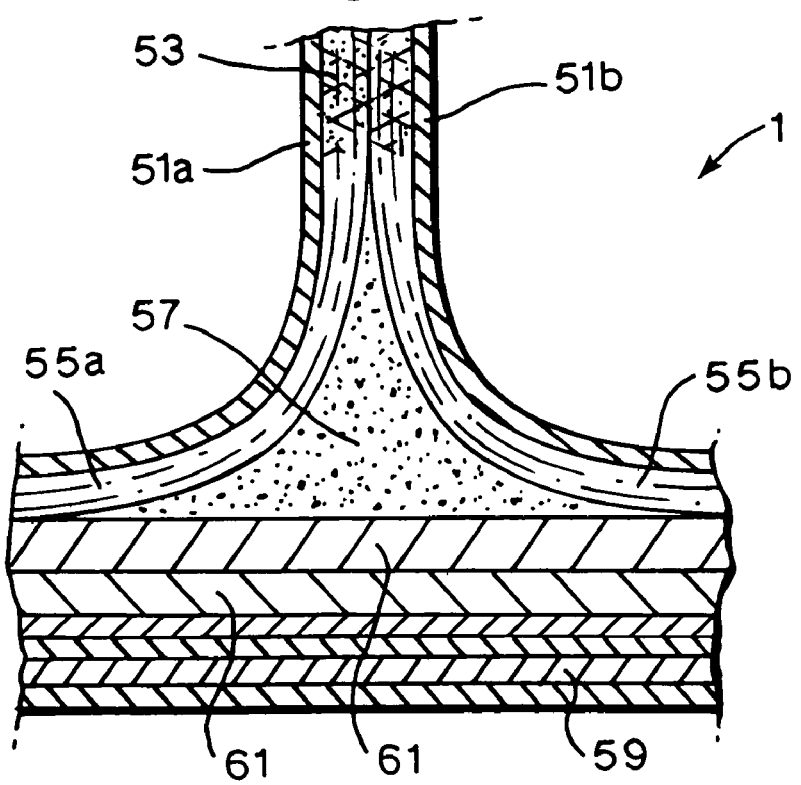
FIG. 6 is a cross-section on the line VI—VI of FIG. 4.

FIG. 4 shows an aerofoil vane 1 similar to that of FIG. 1, with like elements indicated by the same reference numbers. FIGS. 5 and 6 show cross-sections through the vane of FIG. 4, respectively at the positions V—V (corresponding to the central waist portion 9) and VI—VI (corresponding to the region near to the leading edge 6).

FIG. 5 shows the internal construction of the vane 1, in the region of the waist 9. The outer surface of the vane 1 is formed from wrapping plies 51a and 51b. A portion 53 of the folded material 2 forms part of the vane 1; the fiber reinforcement in this portion is in a cross-ply or woven configuration. The portion of the folded material 2 that extends into the platform is shown by 55a and 55b. The fiber reinforcement in this portion is essentially unidirectional; this may be achieved by combing out the fibers of the preform. The plies 59 are reinforced by carbon fibers, and form part of the backing member described previously.

FIG. 6 likewise shows the internal construction of the vane 1, this time in the region near to the leading edge 6. As in FIG. 5, 51a and 51b are wrapping plies, which form the outer surface of the vane 1. 53 shows the portion of the folded material 2 forming the vane; the fiber reinforcement in this portion is in a cross-ply or woven configuration. The portion of the folded material 2 that extends into the platform is shown by 55a and 55b. The plies 59 are reinforced by carbon fibers, and form part of the backing member. It will be seen that the thickness of the material 55a and 55b in this region is less than in FIG. 5, because the thickness of the vane 1 is less in this region. Therefore, additional layers 61 are provided to ensure that the total thickness of the platform and backing layer is uniform. The layers 61 are reinforced by glass fabric.

Figure 7:
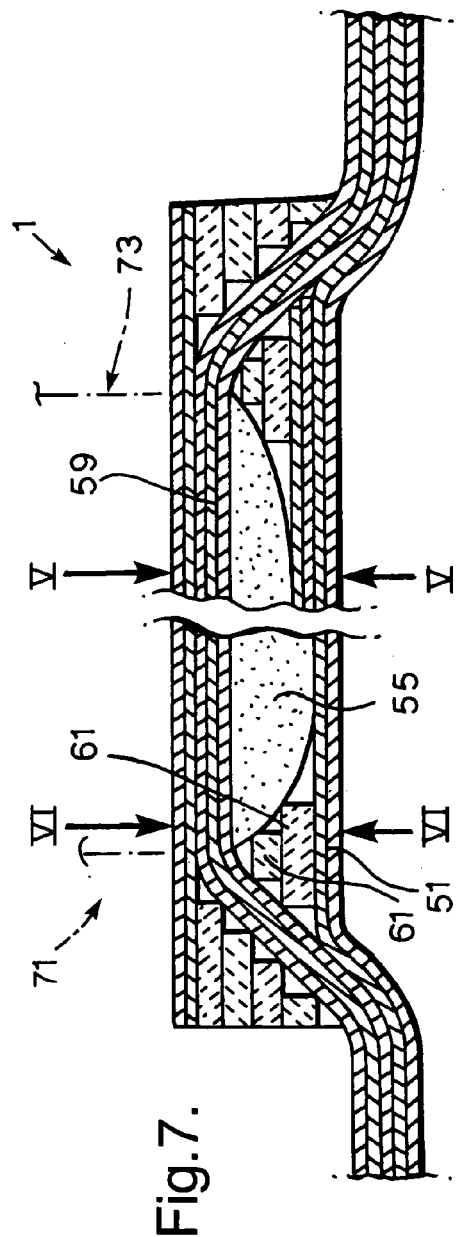
FIG. 7 is a cross-section on the line VII—VII of FIG. 4.

FIG. 7 shows a cross-section on the line VII—VII of FIG. 4. The approximate positions of the cross-sections of FIGS. 5 and 6 are shown, respectively as V—V and VI—VI. The dotted lines 71 and 73 show the positions of the leading and trailing edges of the vane 1.

As in the preceding figures, The portion of the folded material 2 that extends into the platform is shown by 55. The variation in thickness, corresponding to the variation in thickness of the vane 1, may be clearly seen. The additional layers 61, as explained previously, compensate for this variation in thickness, thus ensuring that the total thickness of the platform and backing layer is uniform.

Organic matrix composite materials are better utilized with respect to the present invention than metallic components due to the reduced component weight but also such organic matrix composite components have increased problems with respect to stress and strain fatigue particularly at the leading and trailing edges and particularly those arising from local stiffness in the platform at the interface with the leading and trailing edges. These problems are particularly exacerbated when it is not possible to increase the radius of curvature of the leading and trailing edges as it would reduce gas flow efficiency. In such circumstances differential provision of differently structurally compliant zones in the platform presenting the component will allow achievement of the two objectives of stiff rigid presentation of the component such as an aerofoil vane whilst similarly allowing localized flexibility where expected deformations will be greatest, that it to say where wall section thickness is narrower.

As indicated above the present platform and component could be formed from organic matrix composite materials or may be achievable in metallic components. However, it may be difficult to provide the cut out windows described with cast components. Similarly, with respect to provision of different materials within the platform unit may be more readily achievable through a composite material type. However, that composite material type may comprise organic matrix plies or two different metals or a solid metal with a metal foam or honeycomb foam component embedded in order to create the varying compliance necessary in accordance with the present invention.

We claim:

1. A platform arrangement for supporting a component having variable cross-section thickness in a first direction, the component formed at least in part from a composite material of variable cross-section thickness, characterized in that at least a portion of the composite material extends into the platform to form therein a layer of composite material of variable cross-section thickness in a second direction, the variation of cross-section thickness in the second direction of the layer corresponding to the variation of cross-section thickness in the first direction of the component, so as to provide more compliance in those regions of the platform adjacent to the regions of the component having a relatively thin cross-section in the first direction compared with the rest of the component.

2. A platform arrangement as claimed in claim 1, in which the second direction is substantially perpendicular to the first direction.

3. A platform as claimed in claim 2, in which the component is part of an annular array of components able to rotate about an axis, and the first direction is a circumferential direction and the second direction is a radial direction.

4. A platform arrangement as claimed in claim 1, in which the fibers in the portion of the composite material in the platform are substantially unidirectional.

5. A platform arrangement as claimed in claim 4, in which the fibers in the portion of the composite material in the component are not substantially unidirectional.

6. A platform arrangement as claimed in claim 1, in which the component is integral with the platform.

7. A platform arrangement as claimed in claim 1, in which the platform comprises a backing member.

8. A platform arrangement as claimed in claim 7, in which part of the backing member is formed of material of relatively low stiffness compared with the material of the rest of the backing member, so as to provide more compliance in those regions of the platform adjacent to the regions of the component having a relatively thin cross-section compared with the rest of the component.

9. A platform arrangement as claimed in claim 1, in which the component is an aerofoil vane with a leading edge and a trailing edge.

10. A platform as claimed in claim 9, in which the platform has more compliance adjacent to the leading and trailing edges of the aerofoil vane.

11. A platform arrangement for a component substantially as described in this specification, with reference to and as shown in the accompanying drawings.

12. A gas turbine engine incorporating a platform arrangement as claimed in claim 1.

13. A vane assembly for a gas turbine engine comprising a platform arrangement as claimed in claim 1.

* * * * *